CYRUS W. SALADEE.
Improvement in Top-Props and Joints for Carriages.
No. 120,107. Patented Oct. 17, 1871.
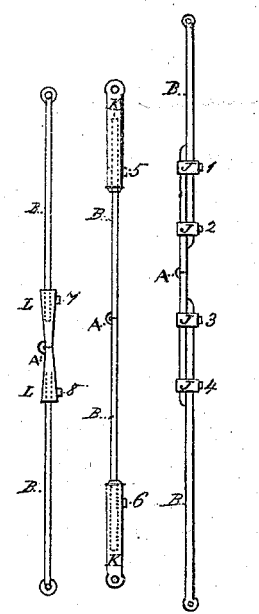
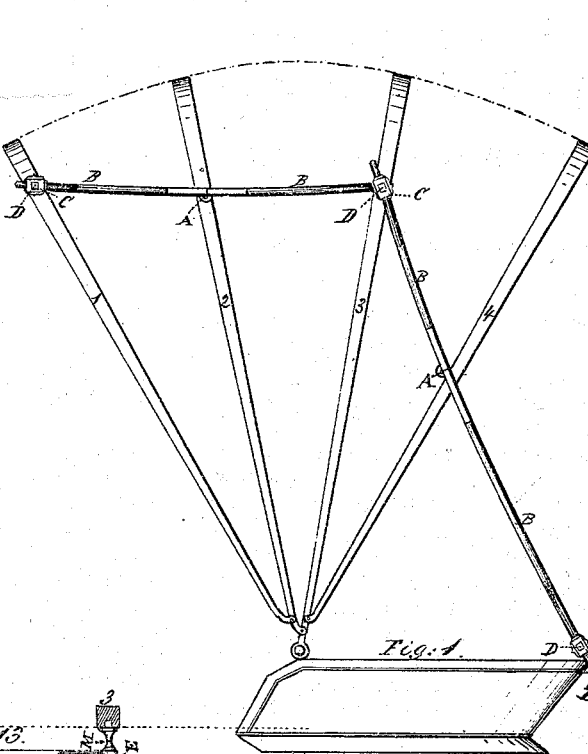
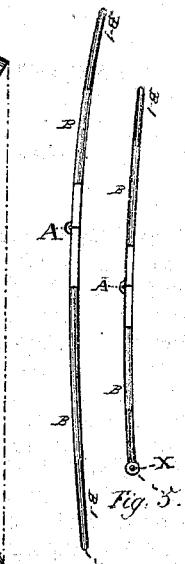
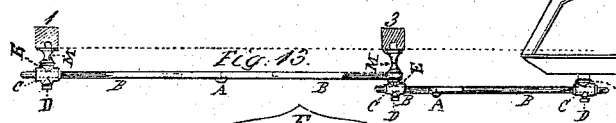
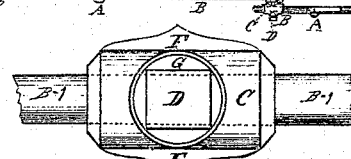
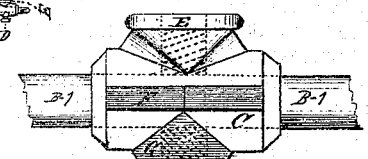
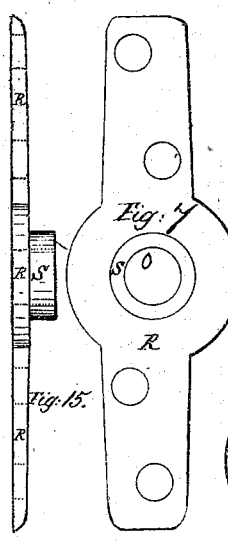
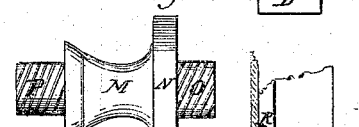
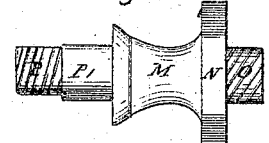
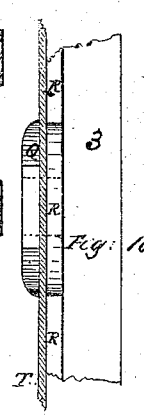
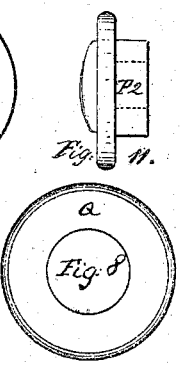
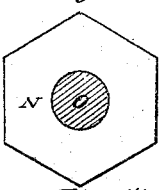
Witnesses: A. Muller, Charles E. Weaver
Inventor: Cyrus W. Saladee

UNITED STATES PATENT OFFICE.

CYRUS W. SALADEE, OF ST. CATHARINES, CANADA.

IMPROVEMENT IN TOP-PROPS AND JOINTS FOR CARRIAGES.

Specification forming part of Letters Patent No. 120,107, dated October 17, 1871.

*To all whom it may concern:*

Be it known that I, CYRUS W. SALADEE, of St. Catharines, in the Dominion of Canada, have invented certain new and useful Improvements in Top-Props and Top-Joints for Carriage-Tops, of which the following is a specification embodying my invention:

The first part of my invention relates to improvement upon the top-prop, as and for the purpose hereinafter fully shown and described. The second part of my invention relates to the top-joints as an entirely new article of manufacture, as well as embracing certain very novel and useful improvements thereupon, as will fully appear from the following description of the same. The joints used for the tops of pleasure-vehicles are now put into the market in a short and unfinished state; hence the name in the market "stub-joints." These joints are designed to be pieced out by the carriage-maker to the lengths required, which vary from one to three inches on each and every different top for which they are intended; and this unavoidable variation in the lengths of the top-joints forbids their completion ready for use by the manufacturer of the joints themselves, and so the manufacturer must needs put them into the market, as is now the universal custom, as stub-joints, and leave the carriage-maker to finish them. The second part of my invention contemplates two important improvements upon the top-joints and their connection with the top-props. The one is to impart an adjustability to the various lengths required for the joints. The other is to prevent the taps of the top-props from losing off by any possible chance whatever—a prevalent fault in those now in general use. And, finally, these improvements admit of the complete manufacture and finish of these irons in sets ready to be applied to the top, and I thus produce a new and important article of manufacture for the carriage hardware market.

I hereinafter show and describe several modifications of the second part of my invention, differing in manner of construction, yet the same in principle and result. I therefore wish it to be expressly understood that I do not limit my claims to any one of the devices shown for lengthening and shortening the joints, as either of them will answer the same purpose, and may be still further modified to suit the fancy of the manufacturer and yet be the same in principle and result.

In the drawing, Figure 1 represents a side elevation of a complete buggy-top with my improvements attached. Fig. 2 represents a side view of the combined adjustable open socket C, set-screw D, piece of the top-joint B, and ornamental flanges F, shown in Fig. 1. Fig. 3 is a top view of Fig. 2, in which is seen the tap E combined with the open socket C, by which the latter is secured to the top-prop $m$, as seen in Fig. 13. Fig. 4 is a full side view of the long top-joint B seen in Fig. 1. Fig. 5 is the same view of the short top-joint B seen in Fig. 1. Fig. 6 represents three different modifications for adjusting the length of the top-joints B, as hereinafter more fully described. Fig. 7 is a front view of the T-plate R, into which the top prop $m$ is secured by the screw-ends $o$, seen in Figs. 12 and 9, and showing the raised collar S, over which is placed the loose washer 2, Fig. 8. Fig. 8 is a face view of the washer 2, which drops over the raised collar S, seen in Figs. 7 and 15. Fig. 9 is a detached view of the top-prop $m$ secured to the bow 3, Fig. 1, showing blank space P' of the screw end P for the reception of the rear end of the short top-joint B of Fig. 1, and seen by detached view, Fig. 5. Fig. 10 is an edge view of the bow 3 of Fig. 1, showing edge view of T-plate R of the top-prop $m$, seen in Figs. 7 and 15, the leather T of the top and the loose washer 2, Fig. 8, in position. Fig. 11 is an edge view of the old-style tap of the top-prop $m$, but which is discarded when my combined tap and open socket, seen in Figs. 2 and 3, is used, as seen in Figs. 1 and 13. Fig. 12 is a detached view of the top-prop $m$ used on the front bow 1 of Fig. 1. Fig. 13 is a top view of the complete arrangement of parts, shown in Fig. 1, showing my improved top-props and top-joints in position on the top. Fig. 14 is an inside face view of the top-prop $m$, seen in Figs. 9 and 12, with the screw-end O cut off and shown in section. Fig. 15 is the edge view of the T-plate R of the top-prop $m$, on which is shown the raised collar S, over which is placed the loose collar 2, Fig. 8.

The first part of my invention, which relates to the top-prop independent of my improvements in the top-joints, I intend placing in the market to be used in place of the old-style props and independent of the second part of my invenvention in all cases where that is desirable. For the construction of my improved top-prop I first form the T-plate R, as seen by the enlarged views, Figs. 7 and 15, and on the outside of this plate is formed the solid raised collar S. Now, the T-plate R being in position on the bow of the top, a hole corresponding to the diameter of this raised collar S is cut through the leather of the top, and which is then passed over this collar S and rests next the plate R. The loose washer 2, Fig. 8, is next placed upon the leather over the raised collar S, (see Fig. 10,) after which the prop $m$, Figs. 9 or 12, is screwed into the raised collar S, having the corresponding hole $o$ to receive the screw-end O of the prop $m$, Figs. 9 and 12; and when used independent of the second part of my invention the ordinary screw-tap, Fig. 11, is used. I thus produce a very cheap, simple, and highly-ornamental top-prop for general use. The second part of my invention embraces the idea of adjusting the lengths of the top-joints A B, so that they may be manufactured and placed in the market in a complete and finished state ready to be applied to the tops of pleasure-vehicles without any previous preparation by the carriage-maker. To this end the top-joints A B are wrought full length, substantially as seen by Figs. 4 and 5, with about six inches of the ends B′ made perfectly round, three-eighths of an inch diameter, and finished by japanning or plating, as the fancy may suggest. I now form a tap, E, and an open socket, C, as shown in Figs. 2 and 3, cast of one solid piece. The tap E has a screw-thread cut into it, as shown by the dotted lines, Fig. 3, corresponding with the screw-thread P cut on the outer end of the prop $m$, Figs. 9 and 12; and at right angles with the tap E is formed the open socket C, through which is passed the hole to receive the ends B′ of the top-joints A B, as seen in Figs. 1, 2, 3, and 13. On the outside of this open socket C is formed an elevated base, G, (see Figs. 2 and 3,) through which passes the set-bolt D, and which latter is screwed firmly up against the end B′ of the top-joints A B when in position, and so rigidly hold the ends B′ in the open socket C at any desired point.

This completes substantially the second part of my invention, while the application and operation of the same is as follows, viz: Supposing the top-props to be in position on the bows of the top, as already shown and described; I take up the combined tap and open socket, Figs. 2 and 3, and screw the tap E on the screw-ends P of the prop $m$ on bows 1 and 3 and back of the seat at C′, Fig. 1. I next take up the short joint A B, Fig. 5, and pass the eye X over the screw-end P′, Fig. 9, of the prop $m$ on the bow 3, Fig. 1, and slip the opposite end B′ through the corresponding hole of the open socket C on the bow 1, Fig. 1. I next take up the long joint A B, Fig. 4, and pass the ends through the open sockets C upon the props on the bow 3 and back of the seat at C′, Fig. 1. I now secure the lower end B′ of the long joint into the socket C at C′ in proper position by the set-bolt D, which latter is firmly screwed in against the end B′ of this end of the joint A B and in like manner into the sockets C upon the bows 1 and 3, when the whole is in complete working order. It will now be seen that as the open socket C is made a part of the tap E, (see Fig. 3,) and the ends B′ of the joints A B pass through the socket, it is impossible for the taps E to be lost from their position upon the screw-end P of the props $m$, as they can turn upon the screw-ends of the props only so far as is necessary to admit of raising and lowering the top. And when the leather of the top stretches when in use and the joints become slack, as is the case in all tops, the joints can be tightened by slacking the set-bolts D and adjusting the length of the joints A B in the open sockets C, as the case requires.

By way of giving an ornamental finish to the face sides of the open sockets C, (see Fig. 2,) the flange or any other fanciful design may be adopted.

I have made mention of several modifications that might be adopted for the purpose of lengthening and shortening the top-joints A B, as contemplated in the second part of my invention. I show three different modifications to this end in Fig. 6, which fully explain themselves without further explanation; but I consider the one shown by Figs. 1, 2, 3, 4, 5, and 13 the most desirable and practicable.

I claim as my invention—

1. In top-props, the T-plate R with raised collar S, loose washer 2, and prop $m$, combined and operating in the manner and for the purpose substantially as shown and described.

2. Broadly, as a new article of manufacture, the adjustable top-joints A B, constructed and operating substantially as and for the purpose shown and described.

3. The combination of the tap E, open socket C, set-bolt D, Figs. 2 and 3, with the top-prop $m$ and ends B′ of the top-joints A B, or their equivalents, substantially as and for the purpose shown and described.

CYRUS W. SALADEE.

Witnesses:
CHARLES E. WEAVER,
V. C. CLAYTON. (31)